United States Patent

McGarvey

[15] 3,670,242

[45] June 13, 1972

[54] A SELECTIVE PAGING RECEIVER AND DECODER EMPLOYING AN ELECTRONIC FILTER MEANS

[72] Inventor: Charles F. McGarvey, Ringwood, N.J.

[73] Assignee: Lear Siegler, Inc., Santa Monica, Calif.

[22] Filed: Dec. 3, 1969

[21] Appl. No.: 881,817

[52] U.S. Cl. ....................325/55, 340/171

[51] Int. Cl. ....................H04b 1/100

[58] Field of Search ....................325/55, 64, 346; 340/311, 171

[56] References Cited

UNITED STATES PATENTS

| | | | |
|---|---|---|---|
| 3,541,451 | 11/1970 | Lind | 325/346 |
| 3,377,435 | 4/1968 | Lippert | 325/55 |
| 3,499,995 | 3/1970 | Clark | 325/55 |
| 3,440,353 | 4/1969 | Salmet | 325/55 |
| 2,407,846 | 9/1946 | O'Brien | 325/64 |
| 3,581,283 | 5/1971 | Reddel | 340/171 PF |
| 3,513,399 | 5/1970 | Wycoff | 325/55 |
| 3,022,493 | 2/1962 | Tschumi et al. | 340/171 PF |

*Primary Examiner*—Robert L. Griffin
*Assistant Examiner*—Barry Leibowitz
*Attorney*—Ward, McElhannon, Brooks & Fitzpatrick, Joshua Ward, Raymond J. McElhannon, Lorimer P. Brooks, Joseph M. Fitzpatrick, John Thomas Cella, Alfred L. Haffner, Jr., Stuart A. White, Charles B. Cannon, Harold Haidt, Henry T. Burke, Lawrence F. Scinto, Carroll G. Harper, Edwin T. Grimes, William J. Brunet, Robert M. Freeman, Robert L. Baechtold and Ralph T. Lilore

[57] ABSTRACT

A preset tone grouping arranged in some predetermined order in tone encoded paging signals is detected by attempting to sequentially pass said tone encoded signals through an electric filter. The electric filter is initially arranged to pass only the first tone of the predetermined order and upon the passage of the first tone, the electric filter is then sequentially retuned to pass in the predetermined order the remaining tones of the predetermined tone grouping.

42 Claims, 4 Drawing Figures

INVENTOR.
CHARLES F. McGARVEY
BY
Ward McElhannon Brooks & Fitzpatrick
ATTORNEYS

INVENTOR.
CHARLES F. McGARVEY
BY
Ward McElhannon Brooks Fitzpatrick
ATTORNEYS

INVENTOR.
CHARLES F. McGARVEY
BY
Ward McElhannon Brooks & Fitzpatrick
ATTORNEYS

INVENTOR.
CHARLES F. McGARVEY
BY
Ward McElhannon Brooks & Fitzpatrick
ATTORNEYS

A SELECTIVE PAGING RECEIVER AND DECODER EMPLOYING AN ELECTRONIC FILTER MEANS

This invention relates to carrier wave receivers, decoders and related methods, and more particularly it pertains to selective receivers, decoders and related methods for use in conjunction with selective paging systems to indicate the presence of a predetermined tone grouping or paging code in tone encoded paging signals.

Of all known types of paging systems, selective paging systems are most advantageous as they are extremely flexible and can be used for both "in plant" and "city wide" use. In addition, selective paging systems provide the most realistic means of paging or calling personnel without disturbing or distracting other personnel and without requiring the constant monitoring of all paging calls made. In such selective paging systems, carrier waves are usually broadcast from a central transmitter and are modulated or encoded with different tone groupings or paging codes. These tone groupings may comprise either a plurality of tones transmitted sequentially in some predetermined order or code, or a plurality of tones transmitted simultaneously and grouped in some predetermined order or code. For example, in one widely adopted system, commonly referred to as the Pagemaster Selective Radio Paging System, manufactured by the Bogen Communications Division, Lear Siegler, Inc. of Paramus, New Jersey, the tone groupings comprise three or four sequentially transmitted tones within the audio frequency range. In all such selective paging systems, the encoded paging signals are transmitted to a plurality of receivers carried or otherwise in the vicinity of the personnel to be paged. Each receiver is, however, preset to respond to only one particular tone grouping or paging code when such is present or modulated on the carrier wave transmitted at the central transmitter. Specifically, each receiver detects all encoded paging signals transmitted at the central transmitter, and applies them to its peculiar or distinct decoder section which, if the encoded received paging signal corresponds to the preset paging code for the receiver in question, causes an audible and/or visual alarm to be generated about the immediate vicinity of the receiver.

In the past, the decoders of the selective receivers of the character described have utilized some type of mechanically vibratory arrangement for carrying out the desired decoding or selectivity in the receiver. In one arrangement, a plurality of vibratory means, such as resonant reed devices, tuning forks, or the like, each naturally resonant to a different one of the tones of the paging code or tone grouping preset for the receiver, are used as moving contacts to actuate an alarm circuit in the selective receiver. In another arrangement, piezoelectric devices are used to drive such mechanically vibratory arrangements; but the actuation of the alarm circuit of the receiver in this case is carried out through the closure of separate mechanical contacts arranged to respond to the resonant vibrations of the mechanically vibratory arrangement. In still another arrangement, a like piezoelectric device is placed in communication with both a resonant reed and an associated compliance support. Electrical means are also provided to apply voltages to the piezoelectric device so as to cause it to bend longitudinally and this bending movement is communicated both to the resonant reed and to the compliance support. Outside the resonant frequency range of the resonant reed, the mechanical flexure energy of the piezoelectric device is dissipated essentially in the compliance support. When, however, the bending of the piezoelectric device reaches the resonant frequency of the resonant reed, the reed bends in sympathy with the piezoelectric device and presents a far lower resistance to energy exchange than does the compliance support. In accordance with this arrangement, the selective receiver is tuned by simply adjusting the resonant characteristics of the resonant reed and monitoring the effects of the reed resonance on the capacitive characteristics of the peizoelectric device in a bridge circuit or the like.

These prior decoding arrangements, while adequate for many uses, are subject to many operational difficulties by reason of the use of the described mechanically vibratory arrangements. Such mechanical arrangements not only are subject to mechanical wear and to undesirable distuning over long periods of service, but also are sensitive to serious mechanical shock and thus require, in many instances, a special anti-shock circuit to prevent false triggering of the selective receiver. In addition, these mechanical arrangements are extremely sensitive to temperature and to other environmental conditions, such as humidity. Thus, to date many selective receivers using such mechanical tuning arrangements are not totally reliable and, in many instances, are even subject to false triggering.

In addition, because most prior selective paging receivers utilized some sort of mechanical vibratory arrangement for decoding, considerably difficulty is had in establishing and changing the preset paging code of the paging receiver. Thus, in these prior arrangements the preset paging code is established or changed by inserting a plurality of different individual vibratory assemblies which each respond to a different tone of the preset paging code. This requirement is costly in the maintenance of a selective paging system which utilizes such receivers, since a skilled technician is required to make such changes and since a stocking of these individual vibratory assemblies is usually necessitated.

In accordance with the present invention there is provided a method of decoding tone encoded paging signals of the character described which may be carried out without the use of any type of mechanically vibratory arrangement. In addition, there is contemplated a selective paging receiver and decoder of the character described which detects and functions to decode tone encoded paging signals without the use of such mechanical arrangements. Instead, in accordance with the present invention, an electric filter and circuit are contemplated which are arranged to be sequentially tuned and perform essentially the same selectivity or decoding process as prior mechanical devices. Such electric filter and circuit allow a more accurate control of all receiver parameters from shock and environmental conditions, and contribute to a more reliable and dependable selective receiver. Also, the electric filter and circuit may be completely embodied in solid state circuitry, thereby achieving decoding speeds not available with prior mechanical contact arrangements and permitting increase in transmission rate of the tone encoded signals of the selective paging system. In addition, as the required selectivity is carried out by essentially electrical means, it is possible to prearrange the paging receiver of the present invention during its manufacture, so that it can easily be adapted to respond to all code combinations of the selective paging system without the aid of a skilled technician and without the need of maintenance of costly stock.

According to the present invention, these advantages are achieved by detecting in each selective receiver of the character described, all tone encoded paging signals broadcast from the central transmitter, and by attempting to sequentially pass said tone encoded signals through an electric filter which is initially arranged to pass only the first tone of the tone grouping preset for the receiver in question. Upon the passage of the first tone of this preset grouping through the electric filter, the filter is then sequentially retuned to pass in a predetermined order the remaining tones of the present tone grouping. For example, if sequential tone encoded paging signals are used, the predetermined order would be the order or sequence in which the tones of the preset grouping are transmitted. During the sequential tuning of the electric filter, the number of tones passed through the electric filter is counted, and upon the passage of a number corresponding to the number of tones within the preset grouping, the alarm circuitry of the selective receiver is actuated to indicate that the receiver is being paged.

According to one form of the present invention, the selective paging receiver may comprise an active electric filter arranged to have its frequency bandpass range tuneable in accordance with a plurality of external impedance circuits, each arranged to be separately coupled to the active filter according to a predetermined sequence and to tune the bandpass range of the filter to pass the different tones of an assigned tone grouping. In addition, means are provided in the receiver for detecting the transmitted tone encoded signals of the system and for coupling same to the input of the active filter. A sequence control circuit is provided to connect sequentially each of the plurality of external impedance circuits to the active filter to cause the active filter to sequentially pass tones in a predetermined order. Thus, for example, if the transmitted or paging signals are of a sequential nature, the predetermined order would be the order in which the tones are sequentially transmitted. A sequence detector circuit is connected to the output of the active filter for detecting the passage of all the tones in the tone grouping preset for the receiver in question and for providing a control output when the complete passage of such tones is detected. An indicator means, such as an audible alarm and/or a light source is coupled to the sequence detector circuit for actuation thereby to indicate that the receiver is being paged.

The sequence control circuit may comprise switch means for individually coupling each of the impedance circuits to the active filter in the mentioned sequential manner. Preferably, the switch means is connected to be actuated by signals passed by the active filter. The switch means is initially set to cause the active filter to pass the first tone of the preset tone grouping and to pass the succeeding tones in the grouping upon the passage of their immediately preceding tone. In addition, the switch means is arranged to return to its initial setting after at least one of the tones in the grouping fails to pass through the active filter, which occurs whenever the transmitted encoded tone signals do not correspond to the preset code of the receiver in question.

The sequence detector circuit may be coupled to the switch means to control and reset same in the manner described above, thereby to provide sequential tuning of the active filter. As illustratively embodied, the sequence detector circuit includes a counter circuit comprising a monostable multivibrator and a register circuit, both of which are responsive to the output of the active filter. The multivibrator and register circuit are collectively arranged to count tones passed therethrough. The monostable multivibrator is arranged, however, to be responsive to at least the first tone output of the active filter and the register circuit is arranged to be not responsive to said first tone, but to count the remaining tones passed through the active filter. This arrangement is extremely simple in operation and at the same time economical in that it eliminates the need for an additional counting stage in the register circuit. In a preferred form, the switch means is responsive to the output of the monostable multivibrator and is arranged to switch from its preset or initial condition to cause the active filter to pass the second tone of the preset tone grouping; and the switch means is also coupled to the various counting stages of the register circuit to cause said active filter to pass the remaining tones in the grouping, if they are presented to the active filter. Of course, when the counter circuit counts a number equal to the number of tones in the tone grouping preset for the receiver, the sequence detector circuit actuates the indicator circuit of the receiver to indicate that the receiver is being paged.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception on which this disclosure is based may readily be utilized as the basis for the designing of other structures for carrying out the several purposes of the invention.

Thus, while the several aspects of the present invention may be utilized in conjunction with either simultaneous or sequential tone encoded paging signals, they will be particularly described in connection with a specific embodiment of the invention which is used in connection with sequential tone encoded paging signals and which is chosen for purpose of illustration and description, and is shown in the accompanying drawings, forming a part of the specifications, wherein.

Figure 1:
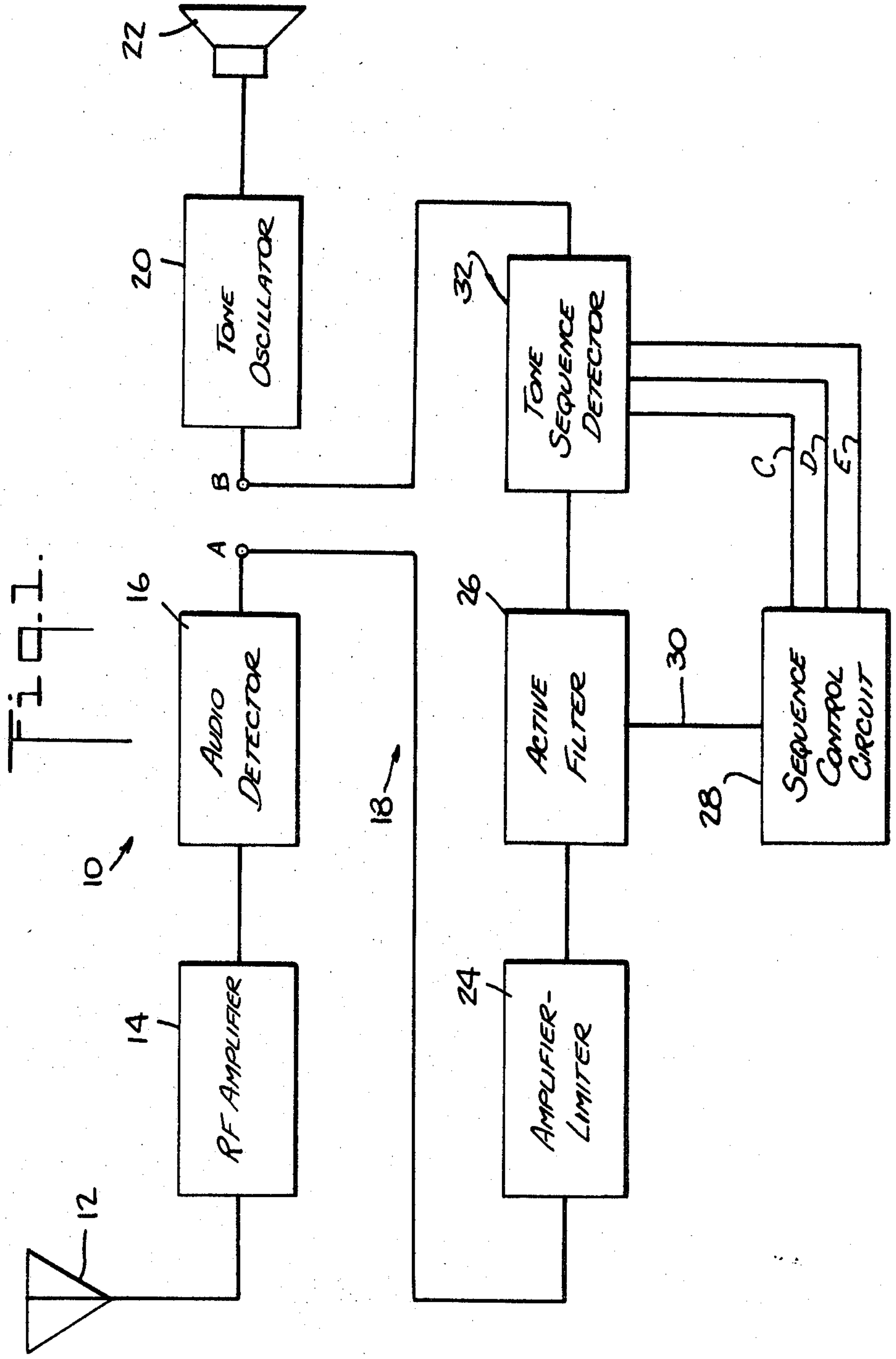
FIG. 1 is a schematic diagram of a selective paging receiver constructed in accordance with the present invention.

In the receiver 10 shown in FIG. 1, carrier waves modulated with tone groupings or paging codes comprising four sequentially transmitted audio tones are received at antenna 12 and are amplified in an RF amplifier 14. An audio detector 16 detects the audio tones modulated on the carrier waves. As shown, the detector is coupled to the output of the RF amplifier 14 and is arranged to present at terminal A all tone groupings or paging codes broadcasted. These tone groupings are then coupled to a decoder shown generally at 18, which is preset to respond only to one particular tone grouping and which is arranged to present at terminal B an actuating signal which causes the operation of a tone oscillator 20. The tone oscillator 20, in turn, is coupled to an alarm indicator, such as a speaker 22 which renders the output of the tone oscillator audible. The alarm indicator may alternatively or in addition comprise a visual indicator, such as a light, Thus, whenever the predetermined tone grouping or paging code preset for the receiver 10 is transmitted, the decoder 18 is rendered operative to cause an audible and/or visual alarm thereby indicating that the receiver 10 is being paged.

As shown in FIG. 1, the decoder 18 comprises an amplifier-limiter 24 arranged to amplify and limit detected tone groupings developed at lead A and to couple same to an active electric filter 26. The amplifier-limiter 24 functions to maintain the level of the detected tone encoded signals at a constant value over a wide variation of inputs to the receiver 10. The active filter 26 on the other hand is arranged to have its bandpass range tuneable in accordance with a control voltage supplied through lead 30 by a sequence control circuit 28. Specifically, the active filter 26 is sequentially tuneable to pass individual tones of the particular tone grouping or paging code preset for the receiver 10, and the sequence control circuit 28 functions to cause the active filter 26 to sequentially pass distinct individual tones of this preset tone grouping in the sequence in which they occur in said grouping. The output of the active filter 26 is coupled to a tone sequence detector 32 which is arranged to count the number of tones passed through the active filter 26 and, upon counting a number equal to the number of tones in the preset tone grouping, provide the actuating signal at lead B for actuating the tone oscillator 20 in the above described manner. The tone sequence detector 32 is, in addition, coupled by leads C, D and E to the sequence control circuit 28 to cause same to tune the active filter 26 to sequentially pass the detected audible tones in the manner described.

Figure 2:
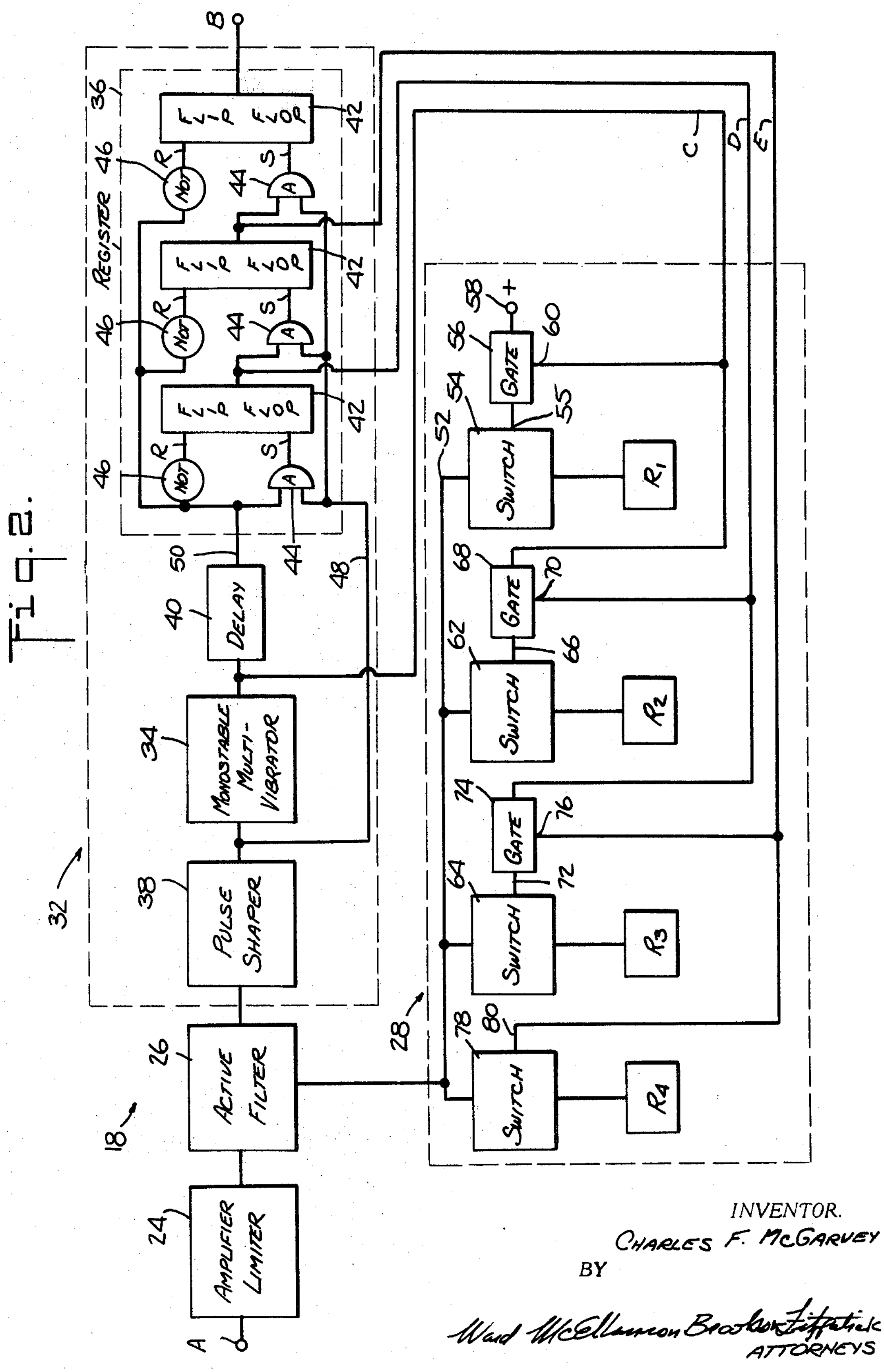
FIG. 2 is a schematic diagram of the decoder section of the receiver shown in FIG. 1.

The specifics of the decoder 18 are shown in more detail in FIG. 2. As shown therein, the decoder 18 includes, as stated previously, the amplifier-limiter 24 arranged to couple the detected tone groupings developed at lead A from the audio detector 16, and provide an output to the active filter 26 which is at a fixed level and independent of the level of the tones at its input. The active filter 26 is preferably a highly stable selective amplifier which is externally tuned to pass individual tones of the preset tone grouping. An operational filter manufactured by Western Microwave Laboratories, Inc. of Santa Clara, California and designated Model 1 and Model 2 Series, is satisfactory for this purpose. The tuning of the active filter 26 is achieved by means of resistors R1, R2, R3 and R4 of the sequence control circuit 28, which are individually connected to the active filter 26 at various times during the operation of the decoder 18 in a manner more fully described hereinafter. Such tuning resistors provide independent adjustment of Q and center frequency of the active filter 26. Thus, the output of the active filter 26 is a function of gain, time, Q and frequency; and each tone of proper frequency coupled to the active filter 26 by the amplifier-limiter 24 for a specified time allows the filter output to build up to a workable level to trigger the tone sequence detector 32.

As stated previously, the tone sequence detector 32 functions to count the number of tones passed through the active filter 26, as well as to trigger the sequence control circuit 28 to control the bandpass range of the active filter 26. The counting and triggering functions of the tone sequence detector 32 are carried out by a counting circuit comprising a monostable multivibrator 34 and a register 36 driven by the monostable multivibrator 34.

The monostable multivibrator 34 and the register 36 are interconnected so as to count the number of tones passed through the active filter 26. When this number reaches the number of tones in the preset tone grouping, there is provided an actuating output at lead B for controlling the tone oscillator 20 of the receiver 10. Specifically, the monostable multivibrator 34 is coupled to the active filter 26 through a pulse shaper 38 which shapes and amplifies the output of the active filter 26 to a level sufficient to trigger the monostable multivibrator 34. Any of several known circuits may be utilized to carry out the function of the pulse shaper 38; for example, a Schmidt trigger circuit, or the like may be used. The monostable multivibrator 34 is constructed to have an effective "on" interval which corresponds to the interval in which all tones of the preset tone grouping are transmitted. This effective "on" interval may be achieved in two ways. First, the monostable multivibrator 34 may be constructed to have a time constant which maintains the multivibrator 34 "on" for the total tone grouping period in response to the first tone passed through the active filter 26; or alternatively, the monostable multivibrator 34 may be set to remain on only for a period a little longer than the individual tone interval of the tone grouping. In this latter case, the multivibrator is connected to respond to each successive tone passed during its "on" duration by the active filter, and to have its "on" state extended by each such tone. In either case, the output of the monostable multivibrator 34 is coupled to the register 36 by a delay circuit 40 which functions to render the register 36 not responsive to the first tone passed through active filter 26 as more fully described hereinafter.

The register 36 comprises a plurality of set-reset counting stages arranged in multistage fashion and constructed to receive and store pulses to be counted at the first stage and sequentially shift these pulses to subsequent stages in response to the occurrence of subsequent counting pulses. The number of counting stages corresponds to one less than the number of tones used in each of the tone groupings of the selective paging system. Thus, for the four tone sequential paging signal received by receiver 10, the register 36 comprises three R-S counting stages.

Each counting stage comprises a flip flop circuit 42 having a set input (S) derived from the output of an AND circuit 44 and having a reset input (R) derived from the output of a NOT circuit 46. The output of the pulse shaper 38 is supplied by a lead 48 to provide a common input to the AND circuit 44 in each of the stages of the register 36. The other or second input to the AND circuit 44 of the first stage of the register 36 is taken by lead 50 from the output of the delay circuit 40; while the other or second input to the AND circuit 44 of the remaining stages of the register 36 is taken from the output of the flip flop 42 of their immediately preceding stage. The output of the flip flop 42 in the last stage of the register 36 provides an actuating output to the lead B sufficient to drive the tone oscillator 20 as described above. The input of the NOT circuit 46 in the various stages of the register 36 is coupled to the monostable multivibrator 34 through the delay circuit 40.

It will be appreciated that since the input of the first stage of the register 36 is driven by the output of the delay circuit 40 and since the inputs of the other stages of the register 36 are a function of the first stage, the register 36 is not responsive to the first tone passed through the active filter 26, but responsive to all succeeding tones in the preset grouping. This first tone is, however, effectively counted by the monostable multivibrator 34 by its delayed actuation of the register 36 and the remaining tones passed through the active filter 26 are counted in the register 36 after it is rendered active upon the passage of the first tone of the preset tone grouping.

Triggering outputs for controlling the tone sequence control circuit 28 are taken from the output of the monostable multivibrator 34 via lead C, from the output of the first stage of the register 36 via lead D, and from the output of the second stage of the register 36 via lead E, and are connected to the sequence control circuit as hereinafter described.

The sequence control circuit 28 comprises, as previously described, four stable and accurate tuning resistors R1, R2, R3 and R4, which may be of different resistance values, and which when individually connected to the active filter 26, tune it to pass only preselected frequencies, which in the present situation are the coded tones of a paging signal sequence or tone grouping to which the receiving system is set to respond. Thus, the resistor R1 tunes the active filter 26 to pass only the first tone in the grouping; the resistor R2 retunes the filter to pass only the second tone in the grouping; the resistor R3 retunes the filter 26 to pass the third tone of this grouping; and the resistor R4 retunes the filter 26 to pass the last tone of the grouping.

Each of the tuning resistors R1 . . . R4 is connected by an associated electrically operated switch to a common bus 52 connected to the frequency changing input of the active filter 26 through the lead 30. Specifically, the tuning resistor R1 is coupled to the common bus 52 by an electrically operated switch 54, such as a transistor, whose control electrode 55 is connected through a gate 56 to a source of potential at lead 58. The gate 56 is arranged to provide a normally complete connection between the control electrode 55 of the electric switch 54 and the source of potential at lead 58, which is sufficient to maintain the switch 54 closed and thus to normally or initially connect R1 to the bus 52. To this end, the gate 56 is closed only in response to the presence of an actuating signal supplied to its control electrode 60 via lead C from the output of the monostable multivibrator 34 of the tone sequence detector 32. Similarly, tuning resistors R2 and R3 are connected to bus 52 by associated electrically operated switches 62 and 64, respectively. The control electrode 66 of the switch 62 is connected through a gate 68 and lead C to the output of the monostable multivibrator 34. The control electrode 70 of the gate 68, on the other hand, is connected via the lead D to the output of the first stage of the register 36. Similarly, the control electrode 72 of the switch 64 is connected through gate 74 and lead D to the output of the first stage of a register 36, and the control electrode 76 of the gate 74 is connected via lead E to the output of the second stage of the register 36. Lastly, the tuning resistor R4 is connected to bus 52 through an associated electrically operated switch 78 whose control electrode 80 is directly coupled to the output of the second stage of the register 36 by lead E.

The decoder 18 as shown in FIG. 2 operates in the following manner. During quiescent operation, i.e., when no tone encoded signals are transmitted from the transmitter of the paging system, the monostable multivibrator 34 is in its "off" state since no tones are passed through the active filter 26; the register 36 is reset or "cleared" by the operation of the NOT circuits 46 which reset all stages of the register 36 when the monostable multivibrator 34 is "off;" and the sequence control circuit 28 is arranged so that the tuning resistor R1 is connected to the bus 52 to tune the active filter 26 to pass the first tone of the tone grouping preselected for the receiver 10. This last noted condition is achieved by, as stated previously, maintaining the gate 56 in a normally open position so as to apply a closing actuating control to control electrode 55 of switch 54. Also, it will be appreciated that during this time, the tuning resistors R2, R3, and R4 are not connected to the bus 52 because their associated switches 62, 64 and 78 which connect them to bus 52, are controlled in response to an output of the monostable multivibrator 34 and the first and second stages of the register 36, all of which are inactive when the receiver is in its quiescent state.

When the predetermined tone grouping preset for the receiver 10 is transitted, the first tone of the grouping will be detected and coupled via lead A to the amplifier-limiter 24 wherein it is amplified and has its level fixed. Since the active filter 26 is initially tuned to pass the fist tone of this tone grouping, the first tone is effectively passed through the active filter 26 to the pulse shaper 38. In the pulse shaper 38, this tone is shaped and amplified and simultaneously applied to the monostable multivibrator 34 and the first input of the AND circuit 44 of each stage of the register 36. Since the other input of the AND circuit 44 of each stage of the register 36 is ultimately connected to the monostable multivibrator 34 through the delay circuit 40, the register 36 will be nonresponsive to the presence of this first tone. The presence of the first tone, however, gates "on" the monostable multivibrator 34 whose output is coupled via lead C both to the control electrode 60 of the gate 56 and to the gate 68. The turning "on" of the multivibrator 34 closes gate 56, thus opening corresponding switch 54 and disconnecting R1 from the bus 52, but at the same time provides a control signal which is passed by the normally open gate 68 to close switch 62 and thereby connect resistor R2 to the common bus 52. The connection of resistor R2 to the common bus 52 changes the bandpass range of the active filter 26 to pass only the second tone in the tone grouping preset for the receiver 10.

Immediately after the first tone of the grouping has been transmitted, the second tone of the grouping is transmitted and presented at lead A. Since the active filter 26 is now tuned to pass this second tone, the second tone is also passed to the pulse shaper 38 where it is shaped so as to provide an actuating pulse to both the monostable multivibrator 34 and the first input of the AND circuit 44 in the various stages of the register 36. As stated above, the monostable multivibrator 34 is designed to remain "on" by the presence of successive tones in the tone grouping preset for the receiver 10; and accordingly during the presence of the second tone an output is supplied via the delay circuit 40 to the first input of the AND circuit 44 of the first stage of the register 36. Thus, it will be appreciated that upon the presence of the second tone of the tone grouping preset for the receiver 10, all inputs of the AND circuit 44 of the first stage of the register 36 are present, and thus the flip flop 42 of the first stage is set. Since the remaining stages of the register 36 are ultimately set in response to the output of this first mentioned flip flop 42, and since the output of the first mentioned flip flop has an inherent delay, the remaining stages will not be set by the presence of the second tone of the tone grouping. The setting of the flip flop 42 of the first stage of the register 36 provides, however, an actuating control via lead D which closes gate 68 to remove the tuning effect of resistor R2 and which applies an actuating control via lead D and normally open gate 74 to the switch 64 to connect the resistor R3 to the common bus 52 and thereby retune the active filter 26 to pass the third tone of the tone grouping.

Immediately following the transmission of the second tone of the preset tone grouping, the third tone is transmitted. Again, since the active filter 26 has been retuned to pass this third tone in the manner described above, this third tone is effectively passed through the active filter 26 to the pulse shaper 38 where it is shaped to maintain the monostable multivibrator 36 in its "on" state in the same manner as done by the second tone, and to again trigger the register 36. Thus, since the flip flop 42 of the first stage of register 36 has not been reset during this period, the presence of the third tone causes the output of the pulse shaper 38 to provide a control to the AND circuit 44 associated with the second stage of the register 36 which is simultaneous with the output of the flip flop 42 of the first stage. Thus the flip flop 42 in the second stage of the register 36 is also set. Accordingly, upon the presence of the third tone of the four tone grouping preset for the receiver 10, both the first and second stages of the three stage register 36 are set. Of course, since the monostable multivibrator 34 remains "on" throughout the presence of these first, second and third tones, these stages of the register 36 will not be reset. The setting of the flip flop 42 of the second stage of register 36 provides an output via lead E which is applied through the control electrode 76 of the gate 74 to close same and thereby open the switch 64 and disconnect the resistor R3 from the bus 52. The output of this last mentioned flip flop 42 is also applied via lead E to the control electrode 80 to close switch 78 and connect resistor R4 to the active filter 26 thereby tuning the bandwidth range of the filter to pass the fourth and last tone of the preset tone grouping for receiver 10.

The transmission and reception of the fourth and last tone extends the operation of the monostable multivibrator 34 in the same manner as the second and third tones, as well as causes pulse shaper 36 to apply a pulse via lead 48 to the AND circuit 44 of the third stage of the register 36. Since the flip flop 42 of the second stage of the register 36 is maintained "on" by the continued "on" operation of the monostable multivibrator 34, all inputs of the AND circuit 44 of the last stage of the register 36 are present, and the flip flop 42 associated with this last stage is set, producing an actuating signal at lead B sufficient to turn on the tone oscillator 20 of the receiver 10. Thus, the tone sequence detector 32 has counted a total of four tones transmitted by the central transmitter and, upon counting of these four tones, provides an output which indicates that the receiver is being paged.

The above described cooperation between monostable multivibrator 34 and register 36 also insures that the decoder 18 will not respond to code groupings or codes other than the one preset for the receiver 10. While it is possible for the decoder 18 to at least partly process related code groupings containing either (1) the first tone of this preset tone grouping; (2) tone groupings having two consecutive tones corresponding to the first and second tones of this preset tone grouping; and (3) tone groupings including three consecutive tones corresponding to the first three tones of this preset tone grouping, the tone oscillator 20 will not be actuated by the tone sequence detector 32 in these instances because the counter thereof would not reach the required number of counts. Since the monostable multivibrator 34 is connected to the register 36 in such a manner as to reset same on failure to pass successively the tones of the preset tone grouping, the register 36 of the sequence detector 32 is cleared after the transmission of all of the above described related code groupings and no counting is carried over between transmissions of tone groupings.

Figure 3:
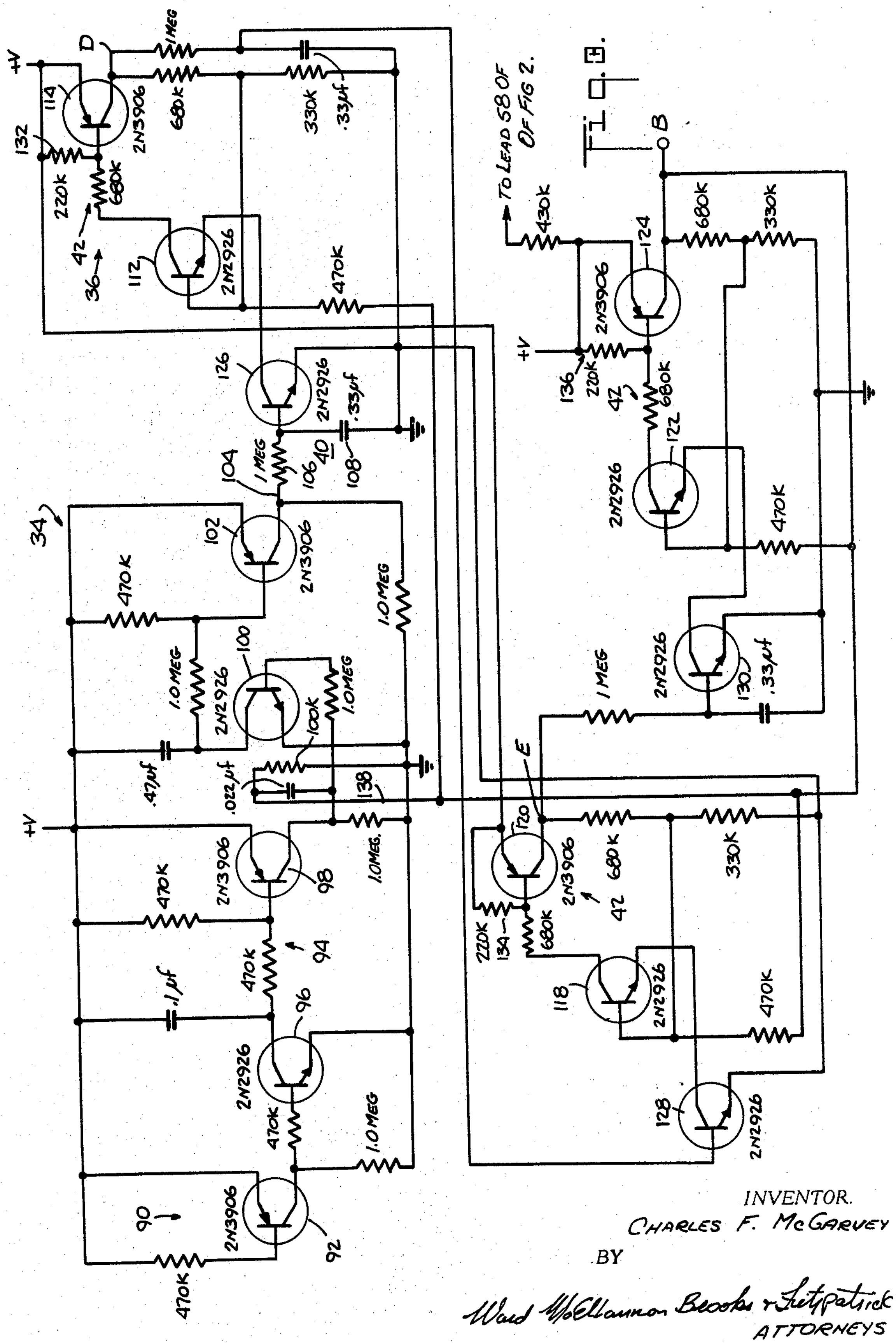
FIG. 3 is a schematic circuit diagram of portions of the sequence tone detector utilized in the decoder of FIG. 2.

While many circuit embodiments may be used to realize the tone sequence detector 32 discussed above, the circuit arrangement shown schematically in FIG. 3, along with the shown parameters provides satisfactory results. As shown in FIG. 3, the pulse outputs of the active filter 26 are coupled through an inverting amplifier, shown generally at 90, and including transistor 92, to trigger a monostable multivibrator circuit shown generally at 94. The monostable multivibrator 94 includes transistors 96 and 98 cross-coupled in a conventional manner with a time constant sufficient to maintain the monostable multivibrator 94 conductive or "on" for a period equal to or less than the period of each tone passed by the active filter 26. The inverting amplifier 90 and the monostable multivibrator 94 function as the pulse shaper 38 described above and provide a sharp triggering pulse for triggering both the monostable multivibrator 34 and the register 36.

The output of the monostable multivibrator 94 is taken at the collector of the transistor 98 and directly coupled to a second monostable multivibrator 34 whose function has been described above in connection with FIG. 2. The monostable multivibrator 34 comprises transistors 100 and 102 which are gated on in response to the output of the first monostable multivibrator 94. Transistors 100 and 102 are cross-coupled in a conventional manner with an impedance of a time constant sufficient to maintain the monostable multivibrator on for a time corresponding to at least the period between the rise or start of the different tones of the tone grouping of the tone encoded signals. The output of the monostable multivibrator 34 is coupled via lead 104 and a delay circuit 40 which comprises resistor 106 and capacitor 108, to a three stage flip-flop arrangement defining the register 36. Each stage of the register 36 includes a flip flop shown generally at 42 in FIG. 3 and comprising two cross-coupled transistors arranged in flip flop configuration. In the first stage of the counter 36, such flip flop configuration is formed by the cross-coupling of transistors 112 and 114; and in the second stage of the register 36 such flip flop configuration is formed by the cross-coupling of transistors 118 and 120; and in the third and last stage of the register 36, such flip flop configuration is formed by the cross-coupling of transistors 122 and 124. It will be noted that the emitter to collector connection of the cross-coupled transistors forming the flip flop 42 in each of these stages, is coupled through a gating transistor which in cooperation with its associated flip flop 42 forms the AND circuit 44 of the decoder shown in FIG. 2. Thus, in the first stage of the register 36, transistors 112 and 114 are connected through a gating transistor 126 which is turned on in response to an output of the monostable multivibrator 34. Similarly, in the second stage of the register 36, the emitter of transistor 118 is coupled to the collector of the transistor 120 through a gating transistor 128 which is turned on in response to the output of the first stage of the register 36 taken at the collector of the transistor 114. Also, in the last stage of the register 36, the emitter of transistor 122 is coupled to the collector of transistor 124 by a gating transistor 130 arranged to be turned on in response to the output of the second stage of the register 32.

The bases of transistors 114, 120 and 124 are connected by suitable associated biasing resistors 132, 134 and 136, respectively, each arranged to turn off their associated transistors whenever the output of the monostable multivibrator 34 is not present or "on." These biasing resistors function logically with the flip flop 42 of the various stages of the register 36 to perform the function of the NOT circuits 46 described above in connection with FIG. 2.

The output of the first monostable multivibrator 94 which as stated corresponds to the output of the pulse shaper 38 shown in FIG. 1 is also coupled via lead 138 to the base of transistors 112, 118 and 122 in the register 36. As stated previously, the coupling of and triggering of these transistors along with their associated gating transistors, i.e., transistors 126, 128 and 130, function as the AND circuits 44 described above in connection with FIG. 2.

During quiescent operation of the sequence detector 32 shown in FIG. 3 both monostable multivibrators 94 and 34 are inactive or "off." Also, since the gating transistors 126, 128 and 130 in each stage of the register 36 are "off" or closed, the output of the flip flop 42 in each stage of register 36 is biased by resistors 132, 134 and 136 to also be off. When the tone sequence to be detected is transmitted, the first tone is coupled via the inverter amplifier 90 to trigger the first monostable multivibrator 94. Triggering the monostable multivibrator 94 produces a positive going pulse at the collector electrode of transistor 98 which is coupled directly to the base of transistor 100 forming the input of the second monostable multivibrator 34. The presence of this positive going pulse at the base transistor 100 causes the monostable multivibrator 34 to turn on, and thus, in turn, produces a positive going pulse at the collector of transistor 102 forming the output of monostable multivibrator 34. The output of monostable multivibrator 34 is coupled via lead 104 through the delay circuit 40 comprising resistor 106 and capacitor 108 to trigger on the gating transistor 126 of the first stage of the register 36. The turning on of transistor 126 couples the emitter of transistor 112 with the collector of transistor 114 thus forming the normal flip flop configuration. Simultaneously with the triggering of the monostable multivibrator 34, the positive going pulse at the output of the collector of transistor 98 forming the output of the monostable multivibrator 94 is coupled via lead 138 to the base of transistors 112, 118 and 122 which form the "set" input of the flip flops 42 in each stage. Since the output of the monostable multivibrator 34 is delayed with respect to the output of the first monostable multivibrator 94, no coincidence of these two outputs may be had at the first stage of register 36. Accordingly, the register 36 is completely immune to the first tone in the tone sequence preset for the receiver 10. After the first tone passes, the first monostable multivibrator 94 returns to its off condition but the second monostable multivibrator 34, because of its longer time constant, remains on for a slightly longer period.

The second tone of the tone grouping almost immediately follows the first and is coupled through the inverting amplifier 90 to again turn on the monostable multivibrator 94 thereby producing another positive going pulse at the collector of transistor 98 forming the output of the monostable multivibrator 94. This positive pulse is coupled to the base of transistor 100 to maintain "on" the monostable multivibrator 34 of which transistor 100 is a part. Since the monostable multivibrator 34 is maintained on, so also is the gating transistor 126 in the first stage of the register 36. Concurrently, the output of the monostable multivibrator 94 is additionally coupled via lead 138 to the base of transistor 112 forming the "set" input of the flip flop thereof. This causes the flip flop 42 to change state, and thus turn on the gating transistor 128 which couples the output of the first stage with the input of the second stage. Since flip flop 42 of the first stage has an inherent delay, the presence of the second pulse from the monostable multivibrator 94 does not change the state of the second and third stages of the register 36 as they are coupled to the output of the first stage thereof.

Upon receipt of the third and fourth tones of the tone grouping, the operation of the monostable multivibrator 34 is maintained on as in the presence of the second tone, and the second and third stages of the register 36 are similarly sequentially set. Thus, when all tones of the tone grouping have been passed by the active filter 26, a positive going output is produced at lead B causing actuation of the tone generator 22.

Immediately following the fourth and final tone of the grouping, the output of the monostable multivibrator 34 returns to zero, and thereby causing the first transistor 126 in the first stage of the register 36 to be turned off. This causes all the stages of register to turn off and return to their reset condition as determined by their resistors 132, 134 and 136 respectively.

It is possible, because of the above described arrangement, to prearrange the decoder 18 during its manufacture so that it can be easily adapted to respond to all code combinations of the selective paging system without the aid of a skilled technician and without any significant structural modifications.

Figure 4:
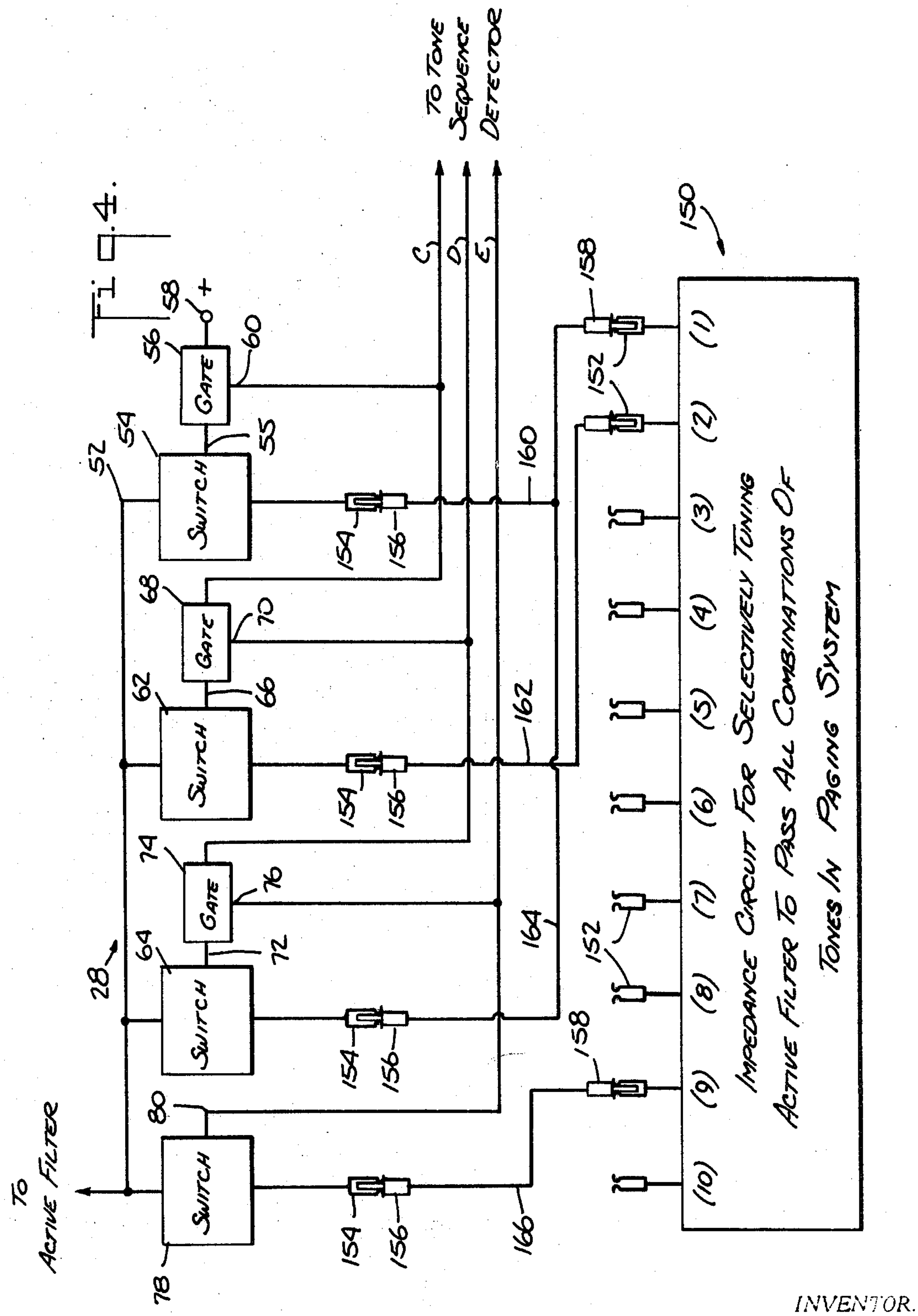
FIG. 4 is a schematic diagram of one tone sequence detector constructed in accordance with the present invention and adapted to be changed to respond to all possible code combination of the paging system.

As shown in FIG. 4, the sequence control circuit 28 of a decoder 18 constructed in accordance with the present invention, may be provided with an impedance circuit 150 which includes a plurality of tuning resistors each arranged to tune the active filter 26 to pass individually all the tones used in the paging system. In the impedance circuit 150 shown in FIG. 4, ten tuning resistors (not shown) are included and are arranged to be separately coupled through an output jack 152 to one or more of the switches 54, 62, 64 and 78. Thus, as shown in FIG. 4, ten output jacks 152 are provided in the impedance circuit 150 for individually coupling these resistors through the switches 54, 62, 64 and 78 to the active filter 26. To this end, the inputs of the switches 54, 62, 64 and 78 are provided with input jacks 154; and each is connected to selected output jacks 152 of the impedance circuit 150 by means of a jumper connection having plugs 156 and 158 which engage the input jacks 154 and the output jacks 152, respectively. Thus, in this way it is possible by connecting selected ones of the ten tuning resistors to the input jacks 154 of the switches 54, 62, 64 and 78, to readily adapt the decoder 18 to selectively detect all possible codes of the paging system.

Thus, for example, if it is desired to establish or change the four tone paging code or tone grouping in the sequence control circuit 28 shown in FIG. 4 to respond to a sequential tone grouping comprising a sequence of tones passed by the first, second, first, and ninth resistors of the impedance circuit 150, a jumper connection 160 is provided between the input jack 154 of the switch 54 and the output jack 152 of the first resistor (1) of the impedance circuit 150; a jumper connection 162 is provided between the input jack 154 of the switch 62 and the output jack 152 of the second resistor (2); a jumper connection 164 is provided between the input jack 154 of the switch 64 and the output jack 152 of the first resistor (1); and a jumper connection 166 is provided between the input jack 154 of the switch 78 and the output jack 152 of the ninth resistor (9).

Thus it will be seen that the selective paging receiver of the present invention may be changed to individually respond to all possible codes of the paging system, and that a non-skilled person may make these changes merely by establishing different jumper connections.

Thus, it will be appreciated from the above there is provided in accordance with the present invention, a selective paging receiver, decoder therefore and related methods which are capable of decoding tone encoded paging signal without the need of mechanically resiliently vibrating means and which may be embodied with the use of purely solid state circuitry.

What is claimed and desired to be secured by Letters Patent is:

1. A selective receiver for indicating the presence of a predetermined tone grouping in tone encoded paging signals comprising: electric filter means sequentially tuneable to pass individual tones of said grouping in a predetermined order, means for detecting said tone encoded signals and coupling same to the input of said filter means, sequence detector means coupled to the output of said filter means and arranged to cause said filter means to pass sequentially in said predetermined order the tones of said grouping upon the prior passage of preceding tones of said tone grouping, and indicator means responsive only to the passage through said filter means of the last of the tones of said grouping for indicating said receiver is being paged.

2. A selective receiver as in claim 1 wherein said sequence detector means includes counter means responsive to the output of said filter means, for counting the number of tones passed through said filter means and for actuating said indicator means when a number corresponding to the number of tones in said tone grouping is counted.

3. A selective receiver as in claim 1 wherein said filter means is controllable to selectively pass distinct individual tones, and further including sequence control means responsive to said sequence detector means for controlling said filter means to sequentially pass tones in said predetermined order.

4. A selective receiver as in claim 3 wherein said sequence control means is coupled to said filter means to quiescently tune said filter means to pass the first tone of said predetermined order and wherein said sequence detector means includes counter means responsive to the output of said filter means for counting the number of tones passed and for actuating said indicator means when all tones of said grouping are counted.

5. A selective receiver as in claim 4 wherein said counter means includes monostable multivibrator means and register means, each coupled to the output of said filter means, said monostable multivibrator means being responsive to at least the first tone passed through said filter means for operating said sequence control means and causing said filter means to tune to the second tone in said grouping, and said register means being arranged to be nonresponsive to said first tone pulse and to count the remaining tones in said sequence.

6. A selective receiver as in claim 5 wherein said counter means includes gate means coupled to the outputs of said filter means and of said monostable multivibrator means for rendering said register means nonresponsive to said first tone of said predetermined order and responsive to all succeeding tones of said grouping.

7. A selective receiver as in claim 6 wherein said monostable multivibrator means is arranged to remain active during substantially complete occurrence of said grouping, and wherein said counter circuit means is arranged to be reset during inactive periods of said monostable multivibrator means.

8. A selective receiver for indicating the presence of a predetermined frequency grouping in frequency encoded paging signals comprising: electric filter means controllable to selectively pass individual frequencies of said grouping, means for detecting said frequency encoded signals and coupling same to the input of said filter means, sequence control means coupled to said filter means for tuning same to sequentially pass frequencies in a predetermined order, sequence detector means connected to the output of said filter means for detecting the passage of the frequencies in said grouping, and indicator means responsive only to the last output of said sequence detector means for indicating said receiver in being paged, said sequence control means being coupled to the output of said filter means for operation in response to the outputs thereat.

9. A selective receiver as in claim 8 wherein said sequence control means is preset to cause said filter means to pass the first frequency in said predetermined order and to pass successively the succeeding frequencies in said predetermined order upon the passage of their preceding frequency.

10. A selective receiver as in claim 9 wherein said sequence control means is constructed to return to its preset condition after at least one subsequent frequency of a detected encoded frequency grouping fails to pass through said filter means.

11. A selective receiver as in claim 9 wherein said sequence control means is operable in response to said sequence detector means to cause said sequential tuning of said filter means.

12. A selective receiver as in claim 11 wherein said sequence detector means includes counter means responsive to the output of said filter means for counting the number of distinct frequencies passed and for actuating said indicator means.

13. A selective receiver as in claim 12 wherein said sequence control means is reset by said counter circuit means.

14. A selective receiver as in claim 13 wherein said sequence control means is operable to cause said sequential tuning of said filter means in response to said counter means.

15. A selective receiver as in claim 14 wherein said counter means includes monostable multivibrator means and register means, said monostable multivibrator means being responsive to at least the first frequency output of said filter means, for operating said sequence control means and causing said filter means to tune to the second frequency of said predetermined order, and said counter circuit being arranged to be nonresponsive to said first frequency and to count the remaining frequencies of said predetermined order.

16. A selective receiver as in claim 15 wherein said sequence control circuit is controlled and reset by both said monostable multivibrator means and said counter circuit means.

17. A selective receiver for indicating the presence of a predetermined tone grouping in tone encoded paging signals comprising: active electric filter means arranged to have its bandpass range tuneable in accordance with external circuit means, a plurality of external circuit means each arranged to be separately coupled to said active filter and to tune its bandpass range to pass different tones of said grouping, means for detecting said tone encoded signals and for coupling same to the input of said active filter means, sequence control means arranged to sequentially connect each of said plurality external circuit means to said active filter to cause said active filter to sequentially pass tones in a predetermined order, sequence detector means connected to the output of said active filter means for detecting the passage of the tones in said grouping in said predetermined order and indicator means responsive only to the last output of said sequence detector means for indicating that said receiver is being paged.

18. A selective receiver as in claim 17 wherein said active filter means is constructed to have its bandpass range varied in response to externally connected impedance means, and wherein each of said external circuit means comprises impedance means for tuning said active filter means to pass a distinct tone of said tone grouping.

19. A selective receiver as in claim 18 wherein said paging signals are sequential tone encoded signals and said predetermined order is the order in which said tones occur in said grouping and wherein said sequence control means comprises switch means for individually coupling each of said impedance means to said active filter means in a sequential manner to pass tones in the sequence which the tones occur in said grouping.

20. A selective receiver as in claim 19 wherein said switch means is coupled to the output of said active filter means and are operable in response thereto.

21. A selective receiver as in claim 20 wherein said switch means is preset to cause said active filter means to pass the first tone of said grouping and to pass the succeeding tones of said grouping upon the passage of the preceding tones of said grouping.

22. A selective receiver as in claim 21 wherein said switch means is constructed to return to its preset condition after at least one subsequent tone of a detected tone encoded grouping fails to pass through said filter means.

23. A selective receiver as in claim 19 wherein said switch means is coupled to said sequence control circuit and is operable in response thereto to cause said sequential tuning of said filter means.

24. A selective receiver as in claim 23 wherein said sequence detector means includes counter means responsive to the output of said active filter means for actuating said indicator means.

25. A selective receiver as in claim 24 wherein said switch means is coupled to said counter means to be controlled and reset thereby.

26. A selective receiver as in claim 25 wherein said counter means includes monostable multivibrator means and register means, said monostable multivibrator means being responsive to at least the first tone output of said active filter means, for operating said sequence control means and for causing said active filter means to tune to the second tone in said grouping, and said register means being arranged to be nonresponsive to said first tone pulse and to count the remaining tones in said grouping.

27. A selective receiver as in claim 26 wherein said switch means is coupled to said monostable multivibrator means and is arranged to switch from its preset condition to cause said active filter means to pass the second tone of said grouping and wherein said switch means is coupled to said register means to cause said active filter means to pass the remaining tones in said grouping.

28. A method of receiving and indicating the presence of a predetermined tone grouping in tone encoded paging signals comprising detecting said tone encoded paging signals, passing said tone encoded signals through an electric filter arranged to pass only the first tone of said grouping, thereafter sequentially retuning said filter to pass the remaining tones in said grouping in the sequence in which they are arranged in said grouping, and causing an output indication only upon the passage of all of said tones in said grouping through said filter.

29. A method of receiving and indicating the presence of a predetermined tone grouping as in claim 28 including the step of counting the number of tones passed through said filter and causing said indication upon the counting of the total number of tones in said grouping.

30. A method of receiving and indicating the presence of a predetermined tone grouping as in claim 28 wherein said filter comprises an active filter arranged to have its bandpass range tuned in accordance with a plurality externally connected circuit means, and wherein the sequential retuning of said active filter is carried out by sequentially connecting each of said plurality of circuit means to said active filter to cause said filter to pass tones in the sequence in which they occur in said grouping.

31. A decoder for determining the presence of an n tone grouping in tone encoded paging signals, wherein n corresponds to the number of tones in said grouping, comprising: an active electric filter arranged to have its bandpass tuned in accordance with external impedance means, n impedance means each arranged to tune said active filter to pass separately the different tones of said tone grouping, n switch means for coupling each of said plurality of impedance means to said active filter, and gate means arranged to operate said n switch means in response to the output of said active filter to cause said active filter to sequentially pass tones in the sequence which the tones are arranged in said grouping, counter means coupled to the output of said active filter for counting the tones passed through said active filter and providing an actuating output only upon the passage through said active filter of n tones whereby presence of an actuating output at said counter indicates presence of said predetermined tone grouping.

32. A decoder as in claim 31 and wherein said n switch means are sequentially operated in response to said counter means.

33. A decoder as in claim 32 wherein said counter means includes monostable multivibrator means and register means each responsive to the output of said active filter means, and delay means coupling the output of said monostable multivibrator means to said register means, said register means having an $n-1$ counting capacity and having an input arranged to respond only to the simultaneous presence of outputs of said active filter means and said monostable multivibrator means.

34. A decoder as in claim 33 wherein said register means is coupled to said monostable multivibrator means to be reset when said monostable multivibrator means is inactive.

35. A decoder as in claim 33 wherein said gate means comprises individual gate circuits associated with the impedance means which cause the first $n-1$ tones to pass through said active filter means counter.

36. A decoder as in claim 35 wherein the gate circuit associate with the impedance means which tunes said active filter means to pass said first tone couples the control element of its associated switch means with a circuit arranged to maintain said associated switch means closed and wherein said gate circuit is operated in response to the output of said monostable multivibrator means.

37. A decoder as in claim 36 wherein the gate circuit which tunes said active filter means to the next tone of said grouping couples the control element of its associated switch means with the output of said monostable multivibrator means and wherein said next gate circuit is operated by the first counting stage of said register means.

38. A decoder as in claim 37 wherein the remaining gate circuits couple the control element of their associated switch means with the operating elements of the gate circuit associated with the impedance means causing immediate prior tuning of said active filter, and wherein said remaining gate circuits are operated by the remaining n-1 stages of said register means.

39. A decoder as in claim 31 wherein said n tone grouping is made up of tones selected from m tones and wherein said n impedance means includes m impedance means each arranged to tune said active filter to pass a different one of said m tones and connector means for separately connecting selected ones of said m impedance means to said n switch means, said selected impedance means being arranged to tune said active filter to pass separately the different tones of said tone grouping.

40. A selective receiver according to claim 1 wherein said sequence, control means includes means for successively connecting said filter means to different impedance terminals for causing said filter means to pass different tones and means for seperately changing the impedance applied to each terminal for changing the coding of said receiver.

41. A selective receiver according to claim 1 wherein said sequence detector means is responsive to the prior passage of a tone by said electric filter means to connect said electric filter means to a different tuning impedance terminal in said predetermined order and wherein said sequence detector means further includes an impedance device capable of providing at each of several connecting points, greater in number than said tunning impedance terminals, a different impedance and connection means for selectively connecting each of said tunning impedance terminals to different ones of said connection points.

42. A selective receiver for indicating the presence of a predetermined modulation grouping in modulation encoded paging signals comprising: modulation selection means sequentially adjustable to pass individual tones of said grouping in a predetermined order, means for detecting said modulation encoded signals and coupling same to the input of said modulation selection means, sequence detector means coupled to the output of said modulation selection means and arranged to cause said modulation selection means to pass sequentially in said predetermined order the modulations of said grouping upon the prior passage of preceding modulations of said grouping, and indicator means responsive to the passage through said modulation selection means of all the modulations of said grouping for indicating said receiver is being paged.

* * * * *

UNITED STATES PATENT OFFICE
CERTIFICATE OF CORRECTION

Patent No. 3,670,242 Dated June 13, 1972

Inventor(s) Charles F. McGarvey

It is certified that error appears in the above-identified patent and that said Letters Patent are hereby corrected as shown below:

Column 14, lines 74 and 75, change "1 wherein said sequence,' to read --3 wherein said sequence--.

Column 4, line 4, change "specifications" to --specification-

Column 7, line 13, change "fist" to --first--;

Column 15, line 3, change "seperately" to --separately--.

Signed and sealed this 29th day of May 1973.

(SEAL)
Attest:

EDWARD M.FLETCHER,JR.
Attesting Officer

ROBERT GOTTSCHALK
Commissioner of Patents

Notice of Adverse Decision in Interference

In Interference No. 98,791, involving Patent No. 3,670,242, C. F. McGarvey, SELECTIVE PAGING RECEIVER AND DECODER EMPLOYING AN ELECTRONIC FILTER MEANS, final judgment adverse to the patentee was rendered Apr. 22, 1975, as to claims 1, 2, 3, 4, 5, 6, 8, 9, 10, 11, 12, 13, 14, 15, 16, 17, 18, 19, 20, 21, 22, 23, 24, 25, 26, 27, 28, 29, 30, 31, 32, 39, 40, 41 and 42.

[*Official Gazette August 5, 1975.*]